US011988029B2

(12) United States Patent
Xia et al.

(10) Patent No.: US 11,988,029 B2
(45) **Date of Patent: *May 21, 2024**

(54) REFRIGERATOR

(71) Applicant: QINGDAO HAIER JOINT STOCK CO., LTD., Qingdao (CN)

(72) Inventors: Enpin Xia, Qingdao (CN); Hao Zhang, Qingdao (CN); Xiaobing Zhu, Qingdao (CN)

(73) Assignee: QINGDAO HAIER JOINT STOCK CO., LTD., Qingdao (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/902,829

(22) Filed: Sep. 3, 2022

(65) Prior Publication Data

US 2022/0412139 A1 Dec. 29, 2022

Related U.S. Application Data

(63) Continuation of application No. 16/627,280, filed as application No. PCT/CN2018/093917 on Jun. 29, 2018, now Pat. No. 11,466,492.

(30) Foreign Application Priority Data

Jul. 1, 2017 (CN) ......................... 201710528804.2

(51) Int. Cl.

| | |
|---|---|
| ***E05D 7/04*** | (2006.01) |
| ***E05D 3/18*** | (2006.01) |
| ***E05D 5/04*** | (2006.01) |
| ***E05D 5/14*** | (2006.01) |
| ***E05D 7/081*** | (2006.01) |

(Continued)

(52) U.S. Cl.

CPC ............. *E05D 7/0407* (2013.01); *E05D 3/18* (2013.01); *E05D 5/046* (2013.01); *E05D 5/14* (2013.01);

(Continued)

(58) Field of Classification Search

CPC ........ F25D 11/00; F25D 11/02; F25D 23/028; F25D 23/10; F25D 2323/024;

(Continued)

(56) References Cited

U.S. PATENT DOCUMENTS 552,485 A * 12/1895 Rich .......................... E05D 3/18 16/358
1,075,130 A * 10/1913 Streberg .................... E05D 3/18 16/358

(Continued)

FOREIGN PATENT DOCUMENTS

| | | |
|---|---|---|
| CN | 106196819 | * 12/2016 |
| CN | 107503608 | * 12/2017 |
| KR | 0168270 | * 1/1999 |

*Primary Examiner* — Daniel J Troy
*Assistant Examiner* — Timothy M Ayres
(74) *Attorney, Agent, or Firm* — Cheng-Ju Chiang

(57) ABSTRACT

The present invention provides a refrigerator, comprising a cabinet, a door and a hinge body, wherein a positioning shaft and a guiding shaft are provided on the hinge body, and a positioning groove and a guiding groove are provided on the door; the door of the refrigerator according to the present invention may be moved by a distance in a direction away from a pivoting side when being opened, thereby avoiding inconvenience of opening the door due to the protrusion of the side wall of the door.

16 Claims, 9 Drawing Sheets

(51) Int. Cl.

| | |
|---|---|
| ***E05D 11/06*** | (2006.01) |
| ***E05D 11/10*** | (2006.01) |
| ***E05D 15/56*** | (2006.01) |
| ***E05F 1/00*** | (2006.01) |
| ***F25D 11/00*** | (2006.01) |
| ***F25D 11/02*** | (2006.01) |
| ***F25D 23/02*** | (2006.01) |
| ***F25D 23/10*** | (2006.01) |

(52) U.S. Cl.

CPC .............. *E05D 7/081* (2013.01); *E05D 11/06* (2013.01); *E05D 11/1007* (2013.01); *E05D 11/1028* (2013.01); *E05D 15/56* (2013.01); *E05F 1/00* (2013.01); *F25D 11/00* (2013.01); *F25D 11/02* (2013.01); *F25D 23/028* (2013.01); *F25D 23/10* (2013.01); *E05Y 2600/20* (2013.01); *E05Y 2600/324* (2013.01); *E05Y 2800/102* (2013.01); *E05Y 2900/31* (2013.01); *F25D 2323/024* (2013.01)

(58) Field of Classification Search

CPC ......... E05D 7/0407; E05D 7/081; E05D 3/18; E05D 5/046; E05D 5/14; E05D 11/06; E05D 11/1028; E05D 15/56; E05F 1/00; E05Y 2600/20; E05Y 2600/324; E05Y 2800/102; E05Y 2900/31

See application file for complete search history.

(56) References Cited

U.S. PATENT DOCUMENTS

| | | | | |
|---|---|---|---|---|
| 2,143,704 | A * | 1/1939 | Kufner | E05D 3/18<br>16/358 |
| 2,435,670 | A * | 2/1948 | Buehler | A01C 15/00<br>220/815 |
| 2,793,387 | A * | 5/1957 | Odell | E05D 3/18<br>16/358 |
| 3,065,498 | A * | 11/1962 | Johnson | E05D 3/18<br>16/359 |
| 3,083,403 | A * | 4/1963 | Noord | E05D 3/18<br>16/361 |
| 5,265,954 | A * | 11/1993 | Keil | E05D 11/00<br>16/358 |
| 6,493,906 | B2 * | 12/2002 | Matteau | E05D 3/18<br>16/358 |
| 8,303,059 | B2 * | 11/2012 | Darney | E05D 3/18<br>312/405 |
| 9,376,845 | B2 * | 6/2016 | Sawaguchi | E05D 3/18 |
| 10,711,496 | B2 * | 7/2020 | He | E05D 3/12 |
| 11,466,492 | B2 * | 10/2022 | Xia | F25D 11/00 |
| 2003/0132689 | A1 * | 7/2003 | Shin | E05D 3/18<br>312/405 |
| 2012/0025686 | A1 * | 2/2012 | Darney | E05D 3/18<br>312/405 |
| 2019/0125083 | A1 * | 5/2019 | Ostrem | A47B 5/04 |

* cited by examiner

REFRIGERATOR

The present application is a continuation application of U.S. patent application Ser. No. 16/627,280, filed on Dec. 27, 2019, which is a 35 U.S.C. § 371 National Phase conversion of International (PCT) Patent Application No. PCT/CN2018/093617, filed on Jun. 29, 2018, which claims priority to Chinese Patent Application No. 201710528804.2, entitled "refrigerator", filed on Jul. 1, 2017, the disclosure of which is incorporated herein by reference in its entirety.

TECHNICAL FIELD

The present invention relates to a refrigerator.

BACKGROUND

At present, a single-shaft hinge is used in a refrigerator, and a door is circumferentially moved around a fixed shaft of the hinge to open and close the door. In a process of opening the door in the existing refrigerator, a ridge portion formed by a side wall and a front wall of the door close to the hinge exceeds an extension line where a side wall of a cabinet is located, and with regard to an embedded refrigerator or in the case where a gap between a refrigerator housing and a wall is small, such a hinge design limits an opening angle of the door of the refrigerator.

In view of this, it is necessary to improve the existing refrigerator to solve the above-mentioned problems.

SUMMARY

An object of the present invention is to provide a refrigerator to solve the problem that a ridge portion exceeds a side wall of an existing refrigerator when a door of the refrigerator is opened.

In order to achieve the above-mentioned objects, the present invention provides a refrigerator, comprising a cabinet and a door for opening and closing the cabinet, wherein the refrigerator further comprises a hinge body fixedly provided on the cabinet, wherein a positioning shaft and a guiding shaft are provided on the hinge body, and a positioning groove fitting with the positioning shaft and a guiding groove fitting with the guiding shaft are provided on the door;

one of left and right sides of the refrigerator which is provided with the hinge body is a pivoting side, the door is in a first state when being closed, the door has a side wall close to the pivoting side in the first state and a front wall away from the cabinet in the first state, the positioning groove has a first position close to the side wall and the front wall and a second position away from the side wall and the front wall compared with the first position, the guiding groove has a third position and a fourth position, and when the door is in the first state, the positioning shaft is located at the second position, and the guiding shaft is located at the fourth position;

the guiding shaft and the guiding groove are provided such that when the door is opened from the first state, the door is rotated with the positioning shaft as a center of rotation, the positioning shaft is moved from the second position to the first position and the guiding shaft is moved from the fourth position to the third position with the limitation of the guiding shaft and the guiding groove, at this point, the door is opened at a certain angle to be in a second state, and the door is moved by a distance towards a side away from the pivoting side;

a pivoting groove communicated with the positioning groove is further provided on the door, one end of the pivoting groove away from the positioning groove is a pivoting position, the guiding groove has a transition groove parallel to the pivoting groove, one end of the transition groove away from the third position is a rotation starting position, the guiding groove further has a rotation ending position, the guiding groove is of an arc shape between the rotation starting position and the rotation ending position, and a center of the arc is a center axis of the positioning shaft when the positioning shaft is located at the pivoting position.

The present invention has the following beneficial effects. The door of the refrigerator according to the present invention may be moved by a distance in a direction away from the pivoting side when being opened, thereby avoiding inconvenience of opening the door due to the protrusion of the side wall of the door.

BRIEF DESCRIPTION OF THE DRAWINGS

Some specific embodiments of the present invention will be described in detail below exemplarily instead of limitatively. The same reference numbers in the drawings identify the same or similar parts. Those skilled in the art should understand that the drawings are not necessarily drawn to scale. In the drawings.

DETAILED DESCRIPTION

Figure 1:
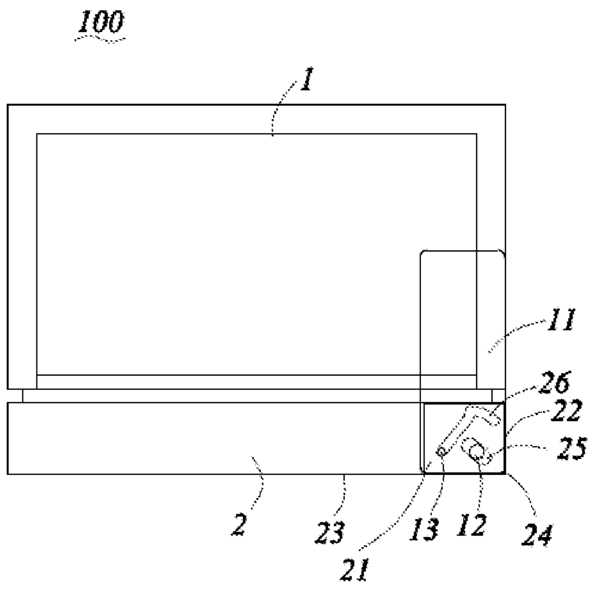
FIG. 1 is a top view of a refrigerator according to a first embodiment of the present invention.
Figure 2:
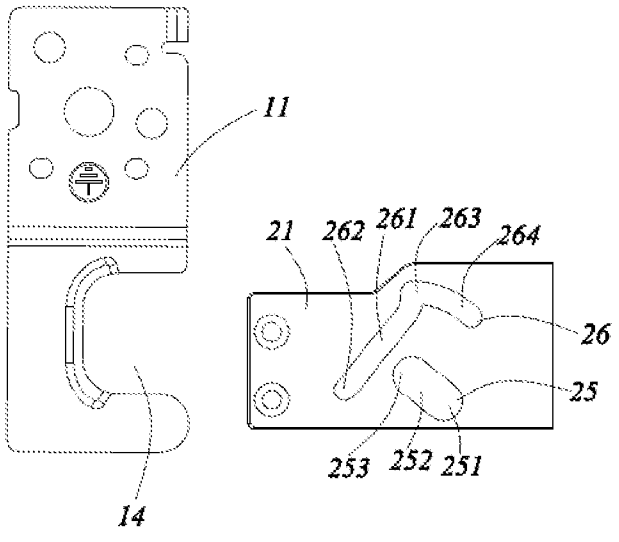
FIG. 2 is a top view of a hinge shaft and a guide block of the refrigerator according to the first embodiment of the present invention.
Figure 3A:
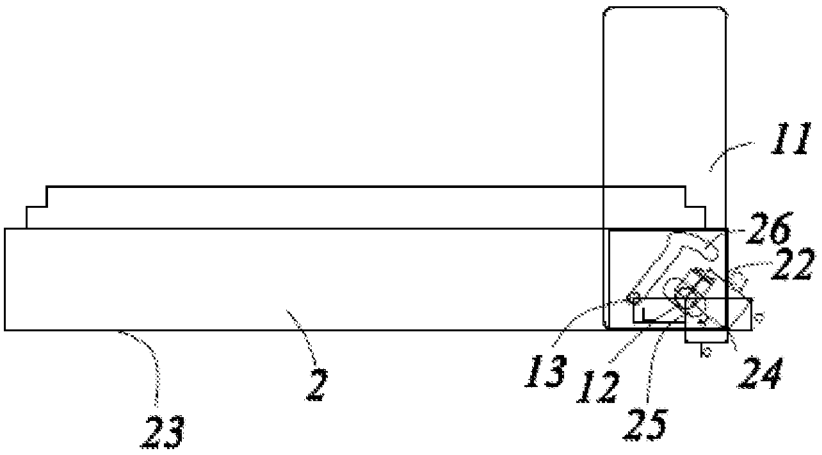
FIGS. 3*a*-3*e* are top views in which a door of the refrigerator is opened at different angles according to a specific implementation of the present invention.
Figure 3B:
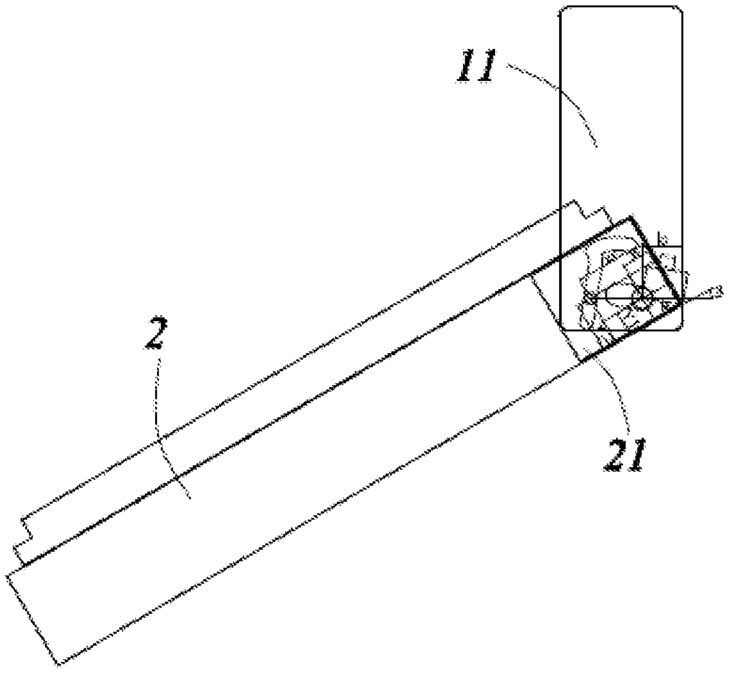
Figure 3C:
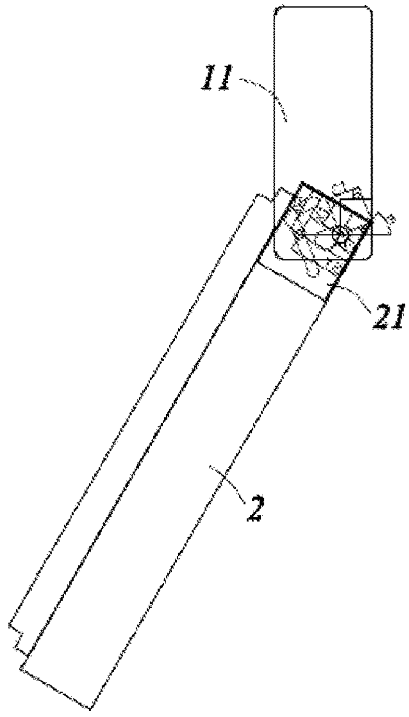
Figure 3D:
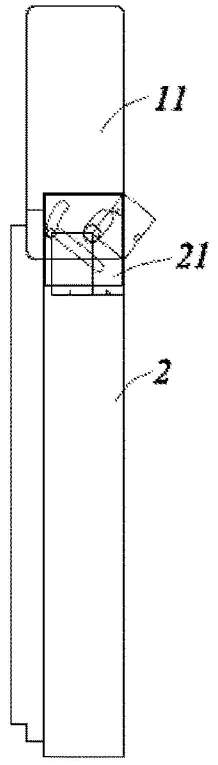
Figure 3E:
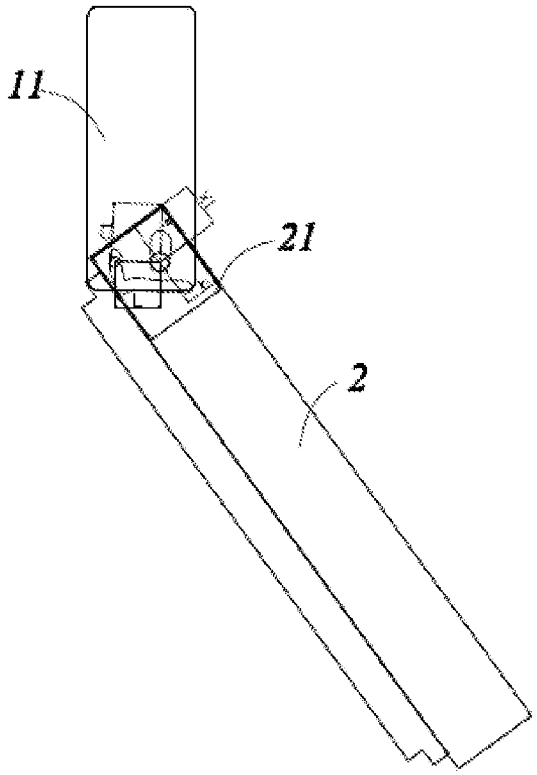

In order to make the objects, technical solutions and advantages of the present invention clearer, the present invention will be described in detail below in combination with drawings and specific embodiments.

As shown in FIGS. 1-3*e*, a refrigerator 100 according to a first embodiment of the present invention comprises a cabinet 1, a door 2 for opening and closing the cabinet 1, a hinge body 11 fixedly provided on the cabinet 1, and a guide block 21 fixed onto the door 2. In the first embodiment, the hinge body 11 and the guide block 21 are provided above and below the door 2.

The positioning groove 25 and the guiding groove 26 are provided on the guide block 21, a positioning shaft 12 and a guiding shaft 13 are provided on the hinge body 11, and the positioning groove 25 fitting with the positioning shaft 12 and the guiding groove 26 fitting with the guiding shaft 13 are provided on the door 2. Certainly, in other embodiments, the refrigerator 100 may also not be provided with the guide block 21, and the positioning groove 25 and the guiding groove 26 are directly provided on the door 2.

When the hinge body 11 and the guide block 21 are provided above the door 2, the guiding shaft 13 and the positioning shaft 12 protrude and extend downwards, and the guiding groove 26 and the positioning groove 25 open side up. When the hinge body 11 and the guide block 21 are provided below the door 2, the guiding shaft 13 and the positioning shaft 12 protrude and extend upwards, and the guiding groove 26 and the positioning groove 25 open side down.

One of left and right sides of the refrigerator 100 which is provided with the hinge body 11 is a pivoting side, the door 2 is in a first state when being closed, and the door 2 has a side wall 22 close to the pivoting side in the first state, a front wall 23 away from the cabinet 1 in the first state, and a lateral ridge 24 formed by the side wall 22 intersecting with the front wall 23.

A fixing groove is formed on the door 2, the guide block 21 is fixed into the fixing groove, a height of the guide block 21 is less than a depth of the fixing groove, and a height of a top of the front wall 23 of the door 2 is greater than or equal to a height of the hinge body 11. A notch 14 opening facing the pivoting side is formed on the hinge body 11 to avoid the front wall 23 of the door 2 when the door 2 is opened, particularly the door is opened through 90 degrees or above.

In the present embodiment, the positioning groove 25 has a first position 251 close to the side wall 22 and the front wall 23, a second position 252 away from the side wall 22 and the front wall 23 compared with the first position 25, and a fifth position 253 away from the side wall 22 and the front wall 23 compared with the second position 252. Centers of the first, second and fifth positions 251, 252 and 253 are located on a same straight line, and an extension line of the centers intersects with the lateral ridge 24. The centers at different positions referred to in the present invention are intersection points of center axes when the positioning shaft 25 or the guiding shaft 26 is located at the positions and a plane of a side of the guide block 21 facing the hinge body 11.

The guiding groove 26 has a third position 261 and a fourth position 262 corresponding to the first position 251 and the second position 252 of the positioning groove 25, and when the door 2 is in the first state, the positioning shaft 12 is located at the second position 252, and the guiding shaft 13 is located at the fourth position 262.

The guiding shaft 13 and the guiding groove 26 are provided such that when the door 2 is opened from the first state, the door 2 is rotated with the positioning shaft 12 as a center of rotation, the positioning shaft 12 is moved from the second position 252 to the first position 251 with the limitation of the guiding shaft 13 and the guiding groove 26, and the guiding shaft 13 is moved from the fourth position 262 to the third position 261; at this point, the door 2 is opened at a certain angle to be in a second state, and the door 2 is moved by a distance towards a side away from the pivoting side. The opening angle is an angle at which a center extension line of the positioning groove 25 intersects with the front wall.

A diameter of the positioning shaft 12 is greater than a diameter of the guiding shaft 13, the guiding shaft 13 is provided at a side away from the side wall 22 compared with the positioning shaft 12, and a connecting line between center axes of the guiding shaft 13 and the positioning shaft 12 is perpendicular to the side wall 22 in the first state; therefore, in the present embodiment, the third position 261 is provided away from the front wall 23 and close to the side wall 22 compared with the fourth position 262.

A distance between the center axis of the positioning shaft 12 when located at the first position 251 and the lateral ridge 24 is less than or equal to a distance between the center axis of the positioning shaft 12 when located at the second position 252 and the side wall 22, such that when the door 2 is opened to the second state from the first state, the door 2 is moved by a distance in a direction away from the pivoting side, and the lateral ridge 24 may not protrude out of a position where the side wall 22 is located when the door 2 is in the first state.

In the present embodiment, the distance between the center axis of the positioning shaft 12 when located at the first position 251 and the lateral ridge 24 is equal to the distance between the center axis of the positioning shaft 12 when located at the second position 252 and the side wall 22. As such, when the door 2 is opened to the second state from the first state, the lateral ridge 24 moves from front to back along the position where the side wall 22 is located when the door 2 is in the first state.

The guiding groove 26 further has a sixth position 263 corresponding to the fifth position 253, and the sixth position 263 is provided away from the front wall 23 and close to the side wall 22 compared with the third position 261.

When the door 2 is further opened from the second state, the positioning shaft 12 is moved to the fifth position 253 from the first position 251, and the guiding shaft 13 is moved to the sixth position 263 from the third position 261, such that the door 2 is opened through 90 degrees to be in a third state, and the door 2 is moved by a distance towards the pivoting side. As such, an opening degree of the cabinet 1 may be increased, opening space towards a user may be increased, and the problem that a drawer in the cabinet 1 may not be opened due to an interference of the door 2 may be avoided.

A distance between the center axis of the positioning shaft 12 when located at the fifth position 253 and the front wall 23 is equal to the distance between the center axis of the positioning shaft 12 when located at the second position 252 and the side wall 22. That is, when the door 2 is moved towards the pivoting side, the lateral ridge 24 is moved from front to back along the position where the side wall 22 is located when the door 2 is in the first state, and when the door 2 is opened through 90 degrees, the front wall 23 of the door 2 reaches the position where the side wall 22 is located in the first state.

The guiding groove 26 further has a seventh position 264 close to the side wall 22 compared with the sixth position 263, and has an arc shape between the seventh position 264 and the sixth position 263, a center line of the arc is the center axis of the positioning shaft 12 when located at the fifth position 253, and when the door 2 is further opened from the third state, the door 2 is rotated with the positioning shaft 12 located at the fifth position 253 as a rotating axis. The sixth position 263 may be understood as a rotation starting position, the seventh position 264 may be understood as a rotation ending position, and an angle of the arc is greater than or equal to 90 degrees. As such, the opening degree of the door 2 may be increased, such that the door 2 may be opened through 180 degrees or more.

Certainly, if in other embodiments, the positioning groove 25 does not have the fifth position 253 and the guiding groove 263 does not have the sixth position 263, the guiding groove 26 may be in an arc shape between the seventh position 264 and the third position 261, and a center line of the arc is a center axis of the positioning shaft 12 when located at the first position 251; that is, the door 2 is rotated with the positioning shaft 12 located at the first position 251 as a rotating axis when being in the second state and further opened.

In addition, as shown in FIGS. 1 and 3*a*-3*e*, in the present embodiment, in the process that the door 2 is opened through 0 to 90 degrees, the door 2 is rotated around a variable point, the variable point may be traced with a locus of $(X=(X1+X2)/2, Y=(Y1+Y2)/2)$, wherein X represents a distance between the variable point and the side wall 22 of the door 2, and Y represents a distance between the variable point and the front wall 23 of the door 2. The movement locus of the variable point may be calculated by the following formulas.

When the door 2 is in the first state, the distance between the center axis of the positioning shaft 12 and the front wall 23 is a, the distance between the center axis of the positioning shaft 12 and the side wall 22 of the door 2 is b, and the distance between the center axes of the positioning shaft 12 and the guiding shaft 13 is L. The distance between the center axis of the positioning shaft 12 and the lateral ridge 24 of the door 2 is C1. a, b and L are constant values, and the value of C1 varies with the position of the door 2.

In the first state, $a2+b2=C12$, and $\tan\gamma=a/b$, wherein γ is an included angle formed by the center extension line of the positioning groove 25 and the front wall 23 of the door 2.

When the rotating angle of the door 2 is m, $0°\le m\le\gamma$, and $COS(\gamma-m)=b/C1$, namely, $C1=b/COS(\gamma-m)$;

the distance between the center axis of the positioning shaft 12 and the side wall 22 of the door 2 is X1, and $X1=C1*COS\ \gamma$;

the distance between the center axis of the positioning shaft 12 and the front wall 23 of the door 2 is Y1, and $Y1=C1*SIN\ \gamma$;

the distance between the center axis of the guiding shaft 13 and the side wall 22 of the door 2 is X2, and $X2=C1*COS\ \gamma+L*COSm$;

the distance between the center axis of the guiding shaft 13 and the front wall 23 of the door 2 is Y2, and $Y2=C1*SIN\ \gamma+L*SINm$.

When the rotating angle of the door 2 is m, $\gamma\le m\le 90°$, and $COS(m-\gamma)=b/C1$, namely, $C1=b/COS(m-\gamma)$;

the distance between the center axis of the positioning shaft 12 and the side wall 22 of the door 2 is X1, and $X1=C1*COS\ \gamma$;

the distance between the center axis of the positioning shaft 12 and the front wall 23 of the door 2 is Y1, and $Y1=C1*SIN\ \gamma$;

the distance between the center axis of the guiding shaft 13 and the side wall 22 of the door 2 is X2, and $X2=C1*COS\ \gamma+L*COSm$;

the distance between the center axis of the guiding shaft 13 and the front wall 23 of the door 2 is Y2, and $Y2=C1*SIN\ \gamma+L*SINm$;

when the rotating angle of the door is m, $m\ge 90°$, and the door 2 is rotated around a fixed axis, wherein the fixed axis is the center axis of the positioning shaft 12 when located at the fifth position 253.

In the refrigerator 100 according to the present embodiment, when the door 2 is opened to the second state from the first state, the door 2 is controlled to be moved in whole by a distance towards an end away from the pivoting side, so as to prevent the interference due to the protrusion of the lateral ridge 24 of the door 2; when the door 2 is opened to the third state from the second state, the door 2 is controlled to be moved in whole by a distance towards an end of the pivoting side, so as to increase the opening degree of the cabinet 1.

Figure 4:
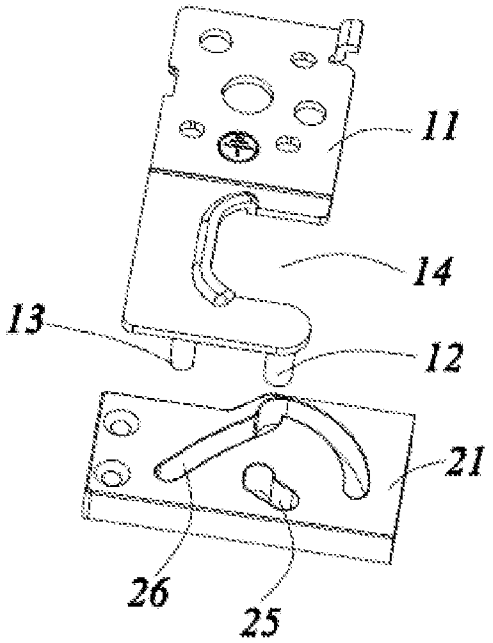
FIG. 4 is a schematic exploded structural view of a hinge body and the guide block of the refrigerator according to a second embodiment of the present invention.
Figure 5:
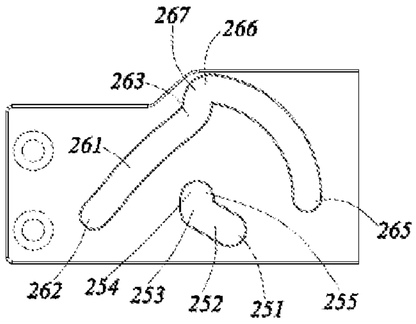
FIG. 5 is a top view of the guide block of the refrigerator according to the second embodiment of the present invention.

FIGS. 4 and 5 show schematic structural views of a hinge body 11 and a guide block 21 of a refrigerator according to a second embodiment of the present invention. The second embodiment mainly differs from the first embodiment as follows.

The guiding groove 26 does not have the seventh position, but has an eighth position 265 close to the side wall 22 compared with the sixth position 263 and a ninth position 266 located between the eighth position 265 and the sixth position 263, and the positioning groove 25 further has a tenth position 254. A transition groove 267 is formed between the ninth position 266 and the sixth position 263, the ninth position 266 is provided at an end of the transition groove 267 away from the sixth position 263 and may also be understood as the rotation starting position, and the eighth position 265 may be understood as the rotation ending position. A pivoting groove 255 is formed between the tenth position 254 and the fifth position 253, and the pivoting groove 255 and the transition groove 267 are provided in parallel. The pivoting groove 255 is communicated with the fifth position 253, and two ends of the transition groove 267 are connected with the sixth position 263 and the rotation starting position respectively.

An extension line of a connecting line between centers of the tenth position 254 and the fifth position 253 intersects with a connecting line between centers of the eighth position

265 and the ninth position 266, the guiding groove 26 is in an arc shape between the eighth position 265 and the ninth position 266, and a center line of the arc is a center axis of the positioning shaft 12 when located at the tenth position 254.

When the door is further opened from the third state, the positioning shaft 12 is moved from the fifth position 253 to the tenth position 254, the guiding shaft 13 is moved from the sixth position 263 to the ninth position 266, the door is rotated with the positioning shaft 12 located at the tenth position 254 as a rotating axis, and the guiding shaft 13 is moved towards the eighth position 265 from the ninth position 266.

In the present embodiment, the above-mentioned changes are made based on the first embodiment, and if other changes in the first embodiment do not conflict with the solution of the present embodiment, the solution of the present embodiment may also be applied to corresponding solutions. As in the first embodiment, when the guiding groove 26 does not have the sixth position 263 and the positioning groove 25 does not have the fifth position 253, the pivoting groove 255 is communicated with the first position 251, and the two ends of the transition groove 267 are connected with the third position 261 and the rotation starting position respectively. As such, the effect of preventing translation of the door may also be achieved.

The solution of the present embodiment may solve the problem that the door sideslips or shakes since a portion of the guiding groove 26 between the ninth position 266 and the eighth position 265 is parallel to the positioning groove 25 when the door is opened through 90 degrees and more.

Figure 6:
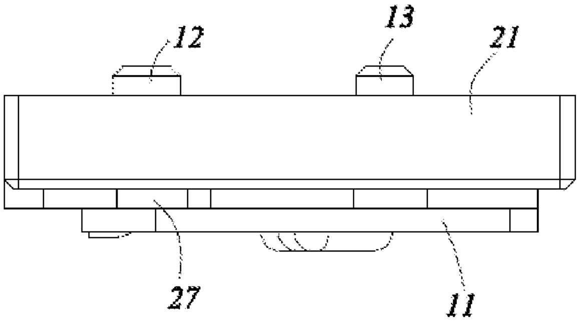
FIG. 6 is a front view of a hinge body and a guide block of a refrigerator according to a third embodiment of the present invention.
Figure 7:
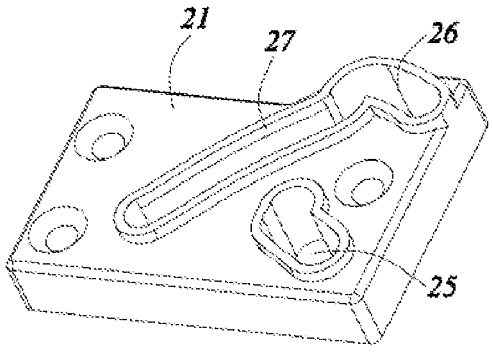
FIG. 7 is a schematic perspective structural view of the guide block of the refrigerator according to the third embodiment of the present invention.

FIGS. 6 and 7 show schematic structural views of a hinge body 11 and a guide block 21 of a refrigerator according to a third embodiment of the present invention. The third embodiment mainly differs from the first embodiment as follows.

The cabinet further comprises a limiting boss 27 provided between the guide block 21 and the hinge body 11 to space apart the guide block 21 from the hinge body 11. The limiting boss 27 has a front end close to the front wall 23 and a rear end away from the front wall 23, so that when the door is in the process of opening, the limiting boss 27 abuts against the hinge body 11 all the time.

The limiting boss 27 is integrally formed on the guide block 21, the number of the limiting boss 27 is two, and the limiting bosses are provided around the guiding groove 26 and the positioning groove 25 respectively.

In the present embodiment, by arranging the limiting bosses 27 to space apart the guide block 21 from the hinge body 11, in the process of opening and closing the door, the abrasion of the hinge body 11 or the guide block 21 is prevented, and further the influence on the balance of the door is avoided due to the mutual incision of a ridge of the hinge body 11 away from the cabinet and a ridge of the guide block 21 facing the cabinet.

Figure 8:
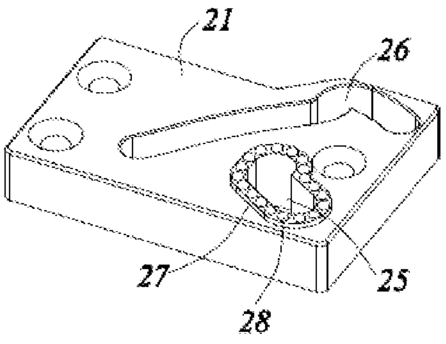
FIG. 8 is a schematic perspective structural view of a guide block of a refrigerator according to another implementation of the third embodiment of the present invention.

FIG. 8 shows a further improvement of the third embodiment mainly in that the limiting boss 27 is substituted with a plurality of limiting balls 28. By arranging the limiting balls 28, not only an effect of the limiting boss 27 may be achieved, but also a sliding friction between the guide block 21 and the hinge body 11 may be changed into a rolling friction, thereby reducing the friction force and reducing the force required by opening and closing the door.

The plural limiting balls 28 are provided around the guiding groove 26 and the positioning groove 25, and meanwhile distributed at different positions of the guide block 21; when the door is rotated, at least three of the limiting balls 28 abut against the hinge body 11 all the time to support the door and prevent the door from shaking, and the at least three of the limiting balls 28 are not located on the same straight line.

The specific arrangement of the limiting balls 28 is a prior art, and is not repeated in the present invention as long as the rolling friction occurs between the guide block 21 and the hinge body 11.

In the present embodiment, the plural limiting balls 28 are provided around the positioning groove 25. Obviously, the limiting balls 28 may also be provided around the guiding groove 26. In addition, the limiting boss 27 may also coexist with the limiting balls 28, i.e., the limiting balls 28 are provided on the limiting boss 27.

Figure 9:
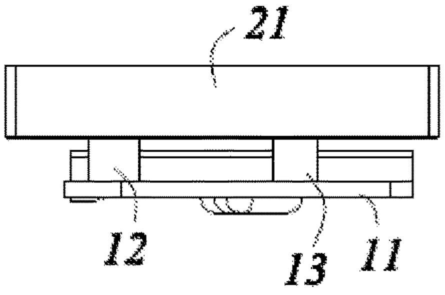
FIG. 9 is a front view of a hinge body and a guide block of a refrigerator according to a fourth embodiment of the present invention.
Figure 10:
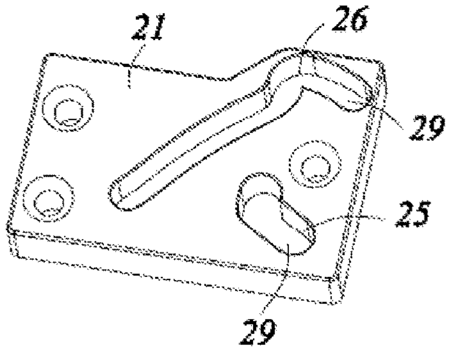
FIG. 10 is a schematic perspective structural view of the guide block of the refrigerator according to the fourth embodiment of the present invention.

FIGS. 9 and 10 show schematic structural views of a hinge body 11 and a guide block 21 of a refrigerator according to a fourth embodiment of the present invention. The fourth embodiment mainly differs from the first embodiment as follows.

The refrigerator further comprises a stopping plate 29 provided at a side of the guide block 21 away from the hinge body 11 and used for shielding the guiding groove 26 and the positioning groove 25, and heights of the guiding shaft 13 and the positioning shaft 12 are the same and both greater than depths of the guiding groove 26 and the positioning groove 25. The stopping plate 29 and the guide block 21 are integrally formed; in addition, the guiding shaft 13 and the positioning shaft 12 have different diameters, and the door may be better limited and prevented from shaking. In the present embodiment, since the guiding shaft 13 and the positioning shaft 12 abut against the stopping plates 29, the door may be supported to space apart the guide block 21 from the hinge body 11.

Figure 11:
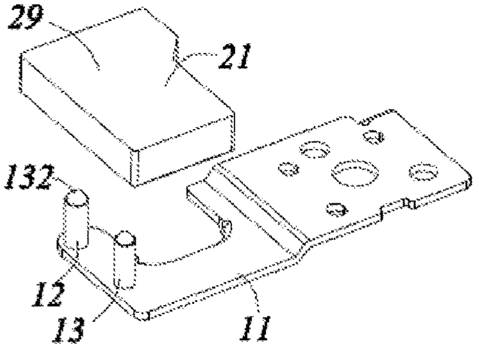
FIG. 11 is a schematic perspective structural view of a hinge body and a guide block of a refrigerator according to another implementation of the fourth embodiment of the present invention.

FIG. 11 shows a further improvement of the fourth embodiment mainly in that balls 132 are provided at one end of the guiding shaft 13 and one end of the positioning shaft 12 abutting against the stopping plate 29, for reducing the friction force between the hinge body 11 and the guide block 21.

Figure 12:
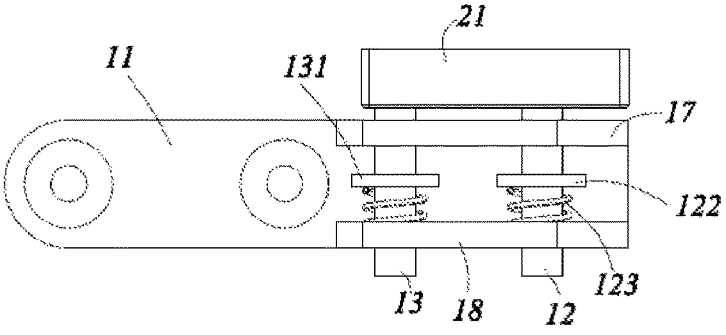
FIG. 12 is a front view of a hinge body and a guide block of a refrigerator according to a fifth embodiment of the present invention.
Figure 13:
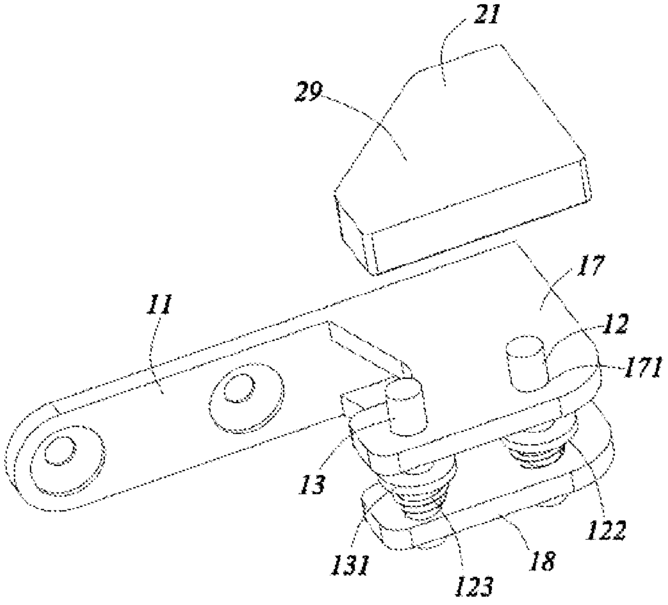
FIG. 13 is a schematic exploded structural view of the hinge body and the guide block of the refrigerator according to the fifth embodiment of the present invention.

FIGS. 12 and 13 show schematic structural views of a hinge body 11 and a guide block 21 of a refrigerator according to a fifth embodiment of the present invention. The fifth embodiment is a further improvement of the fourth embodiment, and mainly differs from the fourth embodiment as follows.

The hinge body 11 comprises a first plate body 17 and a second plate body 18 which protrude and extend out of the cabinet and are provided at intervals in a height direction, the first plate body 17 is close to the guide block 21 compared with the second plate body 18 and provided spaced apart from the guide block 21, and through holes 171 for the guiding shaft 13 and the positioning shaft 12 to pass through are formed on the first and second plate bodies 17 and 18.

A first limiting plate 131 and a second limiting plate 132 for preventing the guiding shaft 13 and the positioning shaft from disengaging from the through holes 171 are provided on the guiding shaft 13 and the positioning shaft 12 between the first and second plate bodies 17 and 18 respectively, the first and second limiting plates 131 and 122 have the same height, and diameters of the first and second limiting plates 131 and 122 are greater than diameters of the through holes 171.

One end of the guiding shaft 13 and one end of the positioning shaft 12 facing the guide block 21 abut against the stopping plates 29, the elastic pieces 123 are provided between the first and second limiting plates 131 and 122 and the second plate body 18 respectively, and a distance between the guide block 21 and the first plate body 17 is less than a distance between the first limiting plate 131 and the second plate body 18.

In the present embodiment, when the door is opened, the door presses and abuts against the guiding shaft 13 and the positioning shaft 12 under the action of gravity, until the elastic pieces 123 are compressed to abut the guide block 21 against the first plate body 17, and at this point, the first and second plate bodies 17 and 18 together support the door. That is, in the present embodiment, the gravity of the door is shared onto the first and second plate bodies 17 and 18. When a coefficient of friction between the elastic pieces 123 and the second plate body 18 is not greater than a coefficient of friction between the guide block 21 and the first plate body 17, and when the door of the refrigerator according to the present embodiment is opened, the friction force may become smaller compared with the first embodiment, and since the friction force is shared onto the first and second plate bodies 17 and 18, the first and second plate bodies 17 and 18 would be abraded by the door to a low degree, and the service life of the door of the refrigerator may be prolonged.

In addition, the differences of the refrigerator according to the present embodiment from the refrigerator according to the fourth embodiment may also be applied to an existing single-hinge-shaft refrigerator.

Specifically, only one rotation shaft is provided on the hinge body, and one rotation shaft groove for fitting with the rotation shaft is provided on the guide block. A stopping plate for shielding the rotation shaft groove is provided at a side of the guide block away from the hinge body, the hinge body comprises a first plate body and a second plate body which are provided at intervals in a height direction, and the first plate body is close to the guide block compared with the second plate body and provided spaced apart from the guide block. Through holes for the rotation shaft to pass through are formed on the first and second plate bodies, a limiting plate is provided on the rotation shaft between the first and second plate bodies to prevent the rotation shaft from disengaging from the through holes, one end of the rotation shaft facing the guide block abuts against the stopping plate, an elastic piece is provided between the limiting plate and the second plate body, and a distance between the guide block and the first plate body is less than a distance between the limiting plate and the second plate body.

When the above-mentioned differences are applied to the single-hinge-shaft refrigerator, the gravity of the door may also be shared onto the first and second plate bodies while the friction force is also shared onto the first and second plate bodies, thereby reducing abrasion.

Figure 14:
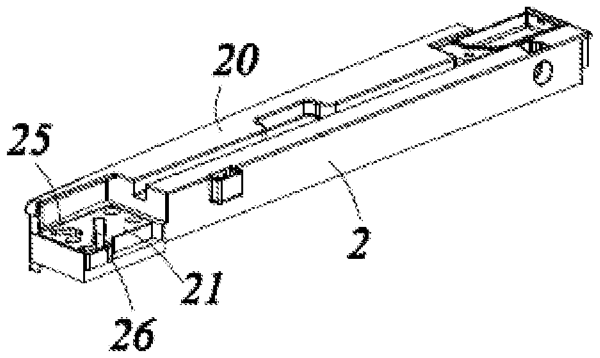
FIG. 14 is a schematic perspective structural view of a decoration strip and a guide block of a refrigerator according to a sixth embodiment of the present invention.
Figure 15:
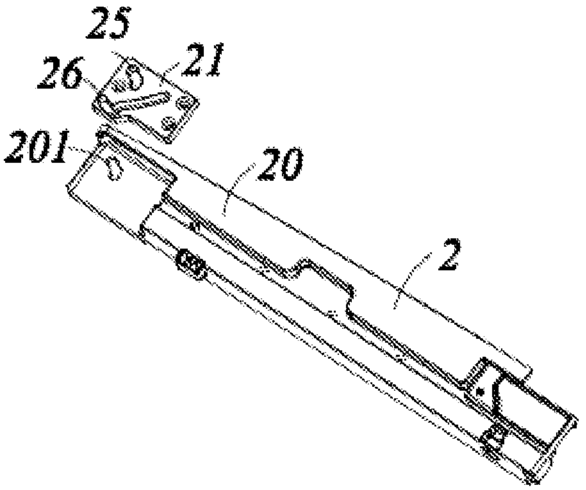
FIG. 15 is a schematic exploded structural view of the decoration strip and the guide block of the refrigerator according to the sixth embodiment of the present invention.
Figure 16:
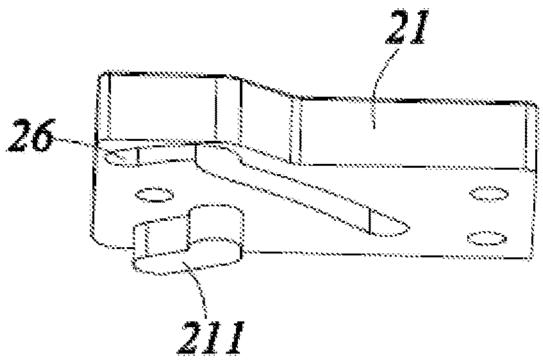
FIG. 16 is a schematic perspective structural view of the guide block of the refrigerator according to the sixth embodiment of the present invention.

FIGS. 14 to 16 show schematic structural views of a hinge body 11 and a guide block 21 of a refrigerator according to a sixth embodiment of the present invention. The sixth embodiment mainly differs from the first embodiment as follows.

The guide block 21 is not fixedly connected with the door directly through tapping; instead, at least one positioning boss 211 protrudes and extends from a side of the guide block 21 facing the door 2, a positioning groove 201 fitting with the at least one positioning boss 211 is provided on the door 2, and the positioning boss 211 and the positioning groove 201 are fitted to position the guide block 21. Compared with the existing manner that the guide block 21 is fixed onto the door 2 directly through tapping, in the present embodiment, before fixing, the fixing block 21 and the door 2 are prepositioned, which prevents the guide block 21 from shifting due to direct fixing, and therefore, the assembled door 2 does not leak cool air.

In the present embodiment, the number of the positioning boss 211 is one, the positioning boss protrudes and extends towards the door 2 from an edge of a side of the positioning groove 25 away from the hinge body 11, and a shape of a section of the positioning boss 211 is coincident with a shape of the positioning groove 25. As long as the shapes of the sections of the positioning boss 211 and the positioning groove 201 are not circular, the positioning effect may be achieved with only one positioning boss 211.

Further, the cabinet further comprises a decoration strip 20 fixed onto the door 2, the guide block 21 and the decoration strip 20 are positioned and fixed, the positioning groove 201 is provided on the decoration strip 20, and the positioning groove 201 is a blind hole to prevent a foaming material from overflowing from the positioning groove 201 when the door 2 is foaming. In addition, a depth of the positioning groove 201 is greater than or equal to a height of the positioning boss 211, so that the positioning boss 211 may be completely received in the positioning groove 201. Preferably, the depth of the positioning groove 201 is equal to the height of the positioning boss 211.

Figure 17:
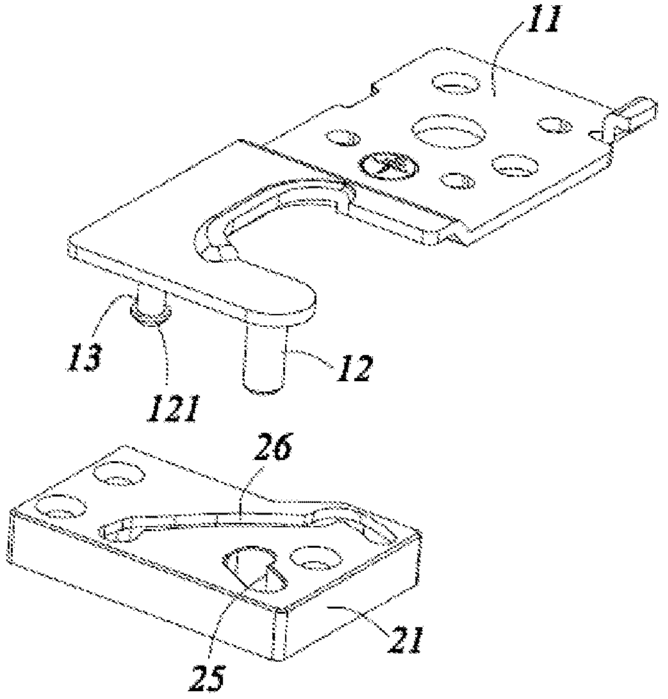
FIG. 17 is a schematic exploded structural view of a hinge body and a guide block of a refrigerator according to a seventh embodiment of the present invention.
Figure 18:
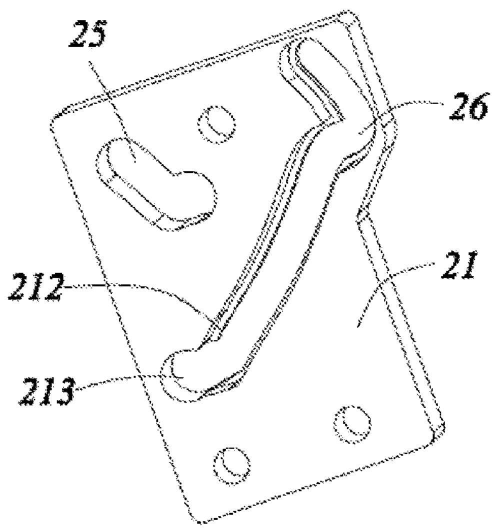
FIG. 18 is a schematic perspective structural view of the guide block of the refrigerator according to the seventh embodiment of the present invention.

FIGS. 17 and 18 show schematic structural views of a hinge body 11 and a guide block 21 of a refrigerator according to a seventh embodiment of the present invention. The seventh embodiment mainly differs from the first embodiment as follows.

When the hinge body 11 and the guide block 21 are provided above the door, the guiding shaft 13 and the positioning shaft 12 protrude and extend from top to bottom, and the positioning groove 25 and the guiding groove 26 open side up to be fitted with the positioning shaft 12 and the guiding shaft 13.

The hinge body 11 further comprises a hook 121 provided at one end of the guiding shaft 13 and/or the positioning shaft 12 facing the guide block 21, the hook 121 protrudes and extends from an end portion of the guiding shaft 13 and/or the positioning shaft 12 towards two sides abutting against the guiding groove 26 and/or the positioning groove 25, the guide block 21 is provided with a clamping structure 212 protruding from opposite inner walls of the guiding groove 26 and/or the positioning groove 25 and extending into the guiding groove 26 and/or the positioning groove 25, and the clamping structure 212 and the hook 121 are buckled.

In such an arrangement, with a clamping force of the hook 121 and the clamping structure 212, the door may be prevented from further going down in case of sinking.

The hook 121 extends towards a periphery from the end portion of the guiding groove 26 and/or the positioning groove 25 and has a circular section, a mounting hole 213 with a diameter greater than a diameter of the section of the hook 121 is provided in the guiding groove 26 and/or the positioning groove 25, and the mounting hole 213 is provided at the end portion of the guiding groove 26 and/or the positioning groove 25. The hook 121 structure extends to the mounting hole 213 from the other end of the guiding groove 26 and/or the positioning groove 25.

In the present embodiment, the hook 121 is provided only on the guiding shaft 13, the fourth position 262 of the guiding groove 26 further extends by a distance in the direction towards the front wall 23, and the mounting hole 213 is provided in the extending guiding groove 26. When the door and the cabinet are assembled, the hook 121 structure is firstly inserted into the mounting hole 213, then the door is moved to move the guiding shaft 13 to the fourth position 262, and the assembling is completed.

Figure 19:
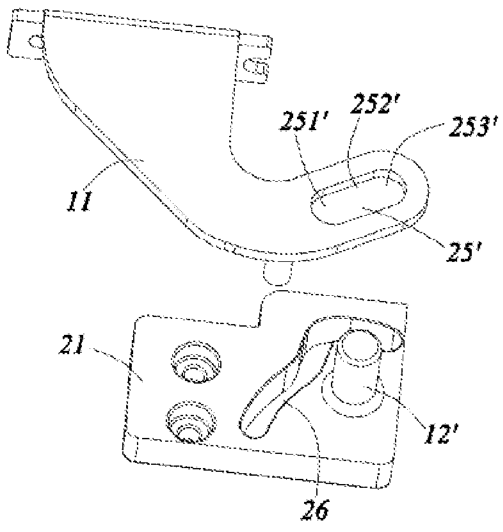
FIG. 19 is a schematic exploded structural view of a hinge body and a guide block of a refrigerator according to an eighth embodiment of the present invention.

FIG. 19 shows a schematic structural view of a hinge body 11 and a guide block 21 of a refrigerator according to an eighth embodiment of the present invention. The eighth embodiment mainly differs from the first embodiment as follows.

The positioning groove 25 is provided on the hinge body 11, and the positioning shaft 12' is provided on the guide block 21 of the door. The position of the guiding shaft 13 and the direction of the guiding groove 26 are the same as those in the first embodiment, and are not repeated in the present embodiment, but the position of the positioning groove 25' needs to be redefined. When the door is in the first state, the first position 251' is provided away from the side wall of the door and close to the front wall, the second position 252' is provided close to the side wall and away from the front wall compared with the first position 251', and the fifth position 253' is provided close to the side wall and away from the front wall compared with the second position 252'.

The distance between the center axis of the positioning shaft 12' and the lateral ridge is less than or equal to the distance between the second position 252' of the positioning groove 25' and the side wall when the door is in the first state.

Further, the distance between the center axis of the positioning shaft 12' and the front wall is equal to the distance between the second position 252' of the positioning groove 25' and the side wall when the door is in the first state.

The process of opening the door in the present embodiment is substantially the same as the process of opening the door 2 in the first embodiment.

Figure 20:
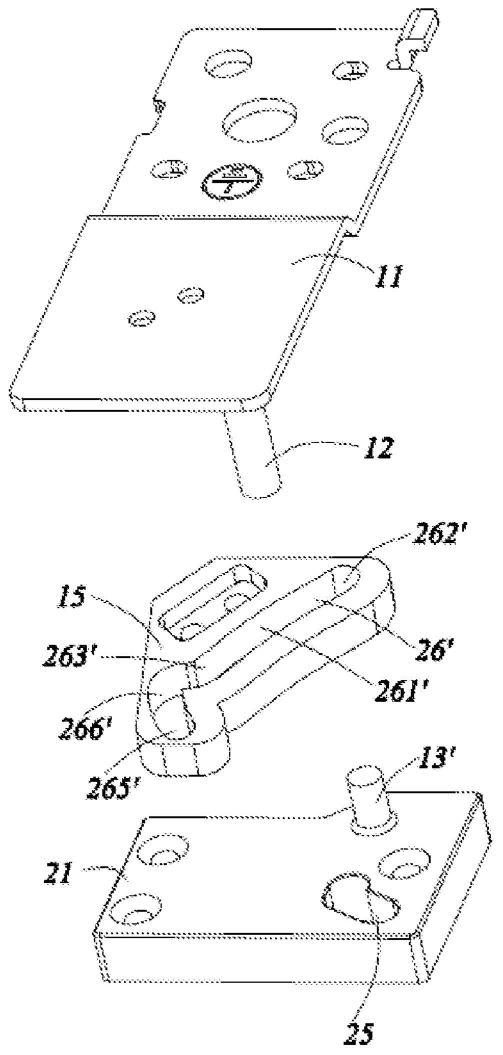
FIG. 20 is a schematic exploded structural view of a hinge body and a guide block of a refrigerator according to a ninth embodiment of the present invention.

FIG. 20 shows a schematic structural view of a hinge body 11 and a guide block 21 of a refrigerator according to a ninth embodiment of the present invention. The ninth embodiment mainly differs from the first embodiment as follows.

A fixed block 15 is fixedly provided on the hinge body 11, the guiding groove 26' is provided on the fixed block 15, and the guiding shaft 13' is provided on the guide block 21. The position of the positioning shaft 12 and the direction of the positioning groove 25 are the same as those in the first embodiment, and are not repeated in the present embodiment, but positions of the guiding shaft 13' and the guiding groove 26' need to be redefined.

In the first state, the guiding shaft 13' is provided at a side away from the front wall compared with the positioning shaft 12, the third position 261' is provided away from the side wall and close to the front wall compared with the fourth position 262', the sixth position 263' is provided away from the side wall and close to the front wall compared with the third position 261', the ninth position 266' is close to the front wall compared with the sixth position 263', and the eighth position 265' is provided close to the side wall compared with the ninth position 266'.

The process of opening the door in the present embodiment is substantially the same as the process of opening the door 2 in the first embodiment.

In the present embodiment, by arranging the fixed block 15 fixed onto the hinge body 11, the door is conveniently repaired and replaced.

In addition, even if the fixed block 15 in the present embodiment is not provided, the guiding shaft 13' may also be provided on the guide block 21, and the guiding shaft 13 is directly provided on the hinge body 11. Moreover, in combination with the eighth and ninth embodiments, both the guiding groove and the positioning groove may also be provided on the hinge body 11, and both the guiding shaft and the positioning shaft are provided on the guide block 21. The guide block 21 may also not be provided with the transition groove and the pivoting groove, but only has the seventh position.

The above embodiments are merely used for explaining the technical solution of the present invention and not limiting. Although the present invention has been described in detail with reference to preferable embodiments, for example, if technologies in different embodiments may be used in conjunction with each other to achieve corresponding effects at the same time, the solutions thereof also fall within a protection scope of the present invention. A person skilled in the art shall understand that various modifications or equivalent substitutions may be made to the technical solution of the present invention without departing from the spirit and scope of the technical solution of the present invention.

What is claimed is:

1. A hinge assembly, which is used to connect a cabinet and a door, wherein the cabinet comprises an accommodation compartment and a pivoting side connected with the hinge assembly; during a process of opening the door, the hinge assembly drives the door to move from the pivoting side toward the accommodation compartment;

wherein the hinge assembly comprises a positioning shaft and a positioning groove engaged with each other as well as a guiding shaft and a guiding groove engaged with each other, the positioning shaft is located at one of the cabinet and the door, the positioning groove is located at the other of the cabinet and the door, the guiding shaft is located at one of the cabinet and the door, and the guiding groove is located at the other of the cabinet and the door; the hinge assembly further comprises a pivoting groove communicated with the positioning groove, and a transition groove which is communicated with the guiding groove and is parallel with the pivoting groove;

wherein the hinge assembly comprises a hinge body fixedly provided on the cabinet and a fixed block fixedly provided on the hinge body, the positioning shaft is located at the hinge body, the guiding groove is located at the fixed block, and the positioning groove and the guiding shaft are located at the door.

2. The hinge assembly according to claim 1, wherein when the door is opened to a second state from a closed state, the guiding shaft is moved in the guiding groove to drive the positioning shaft to move in the positioning groove, thereby driving the door to move from the pivoting side toward the accommodation compartment.

3. The hinge assembly according to claim 1, wherein the positioning shaft and the guiding shaft are located at the cabinet, and the positioning groove and the guiding groove are located at the door.

4. The hinge assembly according to claim 1, wherein the fixed block is fixedly connected to the hinge body by screws.

5. The hinge assembly according to claim 1, wherein the door comprises a front wall apart from the accommodation compartment and a side wall always sandwiched between the front wall and the accommodation compartment, the positioning groove comprises a first position, a second position, and a fifth position from a portion closing to the side wall to a portion apart from the side wall, the guiding groove comprises a fourth position, a third position, a sixth position and a rotation ending position from a portion closing to the side wall to a portion apart from the side wall;

when the door is in the closed state, the guiding shaft is located at the fourth position, and the positioning shaft is located at the second position; when the door is opened to the second state from the closed state, the guiding shaft is moved from the third position to the fourth position to drive the positioning shaft to move from the second position to the first position; when the door is opened to the third state from the second state, the guiding shaft is moved from the third position to the sixth position to drive the positioning shaft to move from the first position to the fifth position; when the door is opened continuously from the third state, the guiding shaft is moved from the sixth position to the rotation ending position, the positioning shaft is kept at the fifth position, and an arch shape is present between the sixth position and the rotation ending position.

6. The hinge assembly according to claim 1, wherein the door comprises a front wall apart from the accommodation compartment and a side wall always sandwiched between the front wall and the accommodation compartment; the positioning groove comprises a first position, a second position, and a fifth position from a portion closing to the side wall to a portion apart from the side wall, the pivoting groove is located on one side of the fifth position apart from the second position, and one end of the pivoting groove apart from the fifth position is configured as a pivoting position, the guiding groove comprises a fourth position, a third position, and a sixth position from a portion closing to the side wall to a portion apart from the side wall, and the transition groove is connected with one side of the sixth position apart from the third position and a rotation ending position is defined close to the side wall relative to the transition groove, one end of the transition groove apart from the sixth position is configured as a rotation starting position; when the door is in the closed state, the guiding shaft is located at the fourth position, and the positioning shaft is located at the second position; when the door is opened to the second state from the closed state, the guiding shaft is moved from the fourth position to the third position to drive the positioning shaft to move from the second position to the first position; when the door is opened to the third state from the second state, the guiding shaft is moved from the third position to the sixth position to drive the positioning shaft to move from the first position to the fifth position; when the door is opened continuously from the third state, the guiding shaft is moved from the sixth position to the rotation starting position to drive the positioning shaft to move from the fifth position to the pivoting position, afterwards, the guiding shaft is moved from the rotation starting position to the rotation ending position, the positioning shaft is kept at the pivoting position, and an arch shape is present between the rotation starting position and the rotation ending position.

7. The hinge assembly according to claim 5, wherein a lateral ridge is formed between the front wall and the side wall, the first position is close to the front wall and the lateral ridge relative to the second position, the second position is close to the front wall and the lateral ridge relative to the fifth position, the fourth position is close to the front wall relative to the third position, and the third position is close to the front wall relative to the sixth position.

8. The hinge assembly according to claim 1, wherein the cabinet comprises an outer side surface which is adjacent to the hinge assembly and is located at an extended section of a door rotation path, the door comprises a front wall apart from the accommodation compartment and a side wall always sandwiched between the front wall and the accommodation compartment, a lateral ridge is formed between the front wall and the side wall; when the door is opened from the closed state to the second state, the hinge assembly drives the door to move, such that the lateral ridge is always located on one side of the outer side surface close to the accommodation compartment.

9. The hinge assembly according to claim 1, wherein the hinge assembly comprises a shaft body and a groove body which are engaged with each other, the hinge assembly further comprises a stopping plate used for shielding the groove body, ball is provided at one end of the shaft body abutting against the stopping plate.

10. The hinge assembly according to claim 9, wherein the hinge assembly comprises a guide block fixed onto the door, the shaft body comprises a positioning shaft and a guiding shaft provided on the hinge body, the groove body comprises a positioning groove and a guiding groove provided on the guide block, the stopping plate is provided at a side of the guide block away from the hinge body and used for shielding the guiding groove and the positioning groove, ball are provided at one end of the guiding shaft and one end of the positioning shaft abutting against the stopping plate.

11. The hinge assembly according to claim 1, wherein the hinge assembly comprises a shaft body and a groove body which are engaged with each other, the hinge assembly further comprises a hook provided at one end of the shaft body, and the hook protrudes and extends from an end portion of the shaft body towards two sides abutting against the groove body to buckle the groove body.

12. The hinge assembly according to claim 11, wherein the hinge assembly comprises a hinge body fixedly provided on the cabinet, and a guide block fixed onto the door, the shaft body comprises a positioning shaft and a guiding shaft provided on the hinge body, the groove body comprises a positioning groove and a guiding groove provided on the guide block, the hook is provided at one end of the guiding shaft and/or the positioning shaft facing the guide block, the hook protrudes and extends from an end portion of the guiding shaft and/or the positioning shaft towards two sides abutting against the guiding groove and/or the positioning groove, the guide block is provided with a clamping structure protruding from opposite inner walls of the guiding groove and/or the positioning groove and extending into the guiding groove and/or the positioning groove, and the clamping structure and the hook are buckled.

13. The hinge assembly according to claim 1, wherein the hinge assembly comprises a hinge body fixedly provided on the cabinet, and a guide block fixed onto the door, a shaft body is located at the hinge body, and a groove body is located at the guide block, a stopping plate for shielding the groove body is provided at a side of the guide block away from the hinge body, the hinge body comprises a first plate body and a second plate body which are provided at intervals in a height direction, and the first plate body is close to the guide block compared with the second plate body and provided spaced apart from the guide block, through holes for the shaft body to pass through are formed on the first and second plate bodies, a limiting plate is provided on the shaft body between the first and second plate bodies to prevent the shaft body from disengaging from the through holes, one end of the shaft body facing the guide block abuts against the stopping plate, an elastic piece is provided between the limiting plate and the second plate body.

14. The hinge assembly according to claim 13, wherein a distance between the guide block and the first plate body is less than a distance between the limiting plate and the second plate body.

15. A hinge assembly, which is used to connect a cabinet and a door, wherein the hinge assembly comprises a positioning shaft and a positioning groove engaged with each other as well as a guiding shaft and a guiding groove engaged with each other, wherein the positioning shaft is located at the cabinet, the positioning groove is located at the door, the guiding shaft is located at one of the cabinet and the door, and the guiding groove is located at the other of the cabinet and the door; the cabinet comprises an accommodation compartment, the door comprises a front wall apart from the accommodation compartment and a side wall always sandwiched between the front wall and the accommodation compartment, a lateral ridge is formed between the front wall and the side wall; when the door is opened from the closed state to a second state, the guiding shaft is moved in the guiding groove to drive the positioning shaft to move in the positioning groove, such that a spacing between the positioning shaft and the lateral ridge is reduced, or a spacing between the positioning shaft and the front wall is reduced, or a spacing between the positioning shaft and the side wall is reduced, the hinge assembly further comprises a pivoting groove communicated with the positioning groove, and a transition groove which is communicated with the guiding groove and is parallel with the pivoting groove;

wherein when the door is opened to the third state from the second state, the spacing between the positioning shaft and the lateral ridge is increased, or the spacing between the positioning shaft and the front wall is increased, or the spacing between the positioning shaft and the side wall is increased;

wherein when the door is opened continuously from the third state, the spacing between the positioning shaft and the lateral ridge is kept unchanged, or the spacing between the positioning shaft and the front wall is kept unchanged, or the spacing between the positioning shaft and the side wall is kept unchanged.

16. A refrigeration apparatus including a hinge assembly, which is used to connect a cabinet and a door of the refrigeration apparatus, wherein the cabinet comprises an accommodation compartment and a pivoting side connected with the hinge assembly; during a process of opening the door, the hinge assembly drives the door to move from the pivoting side toward the accommodation compartment;

wherein the hinge assembly comprises a positioning shaft and a positioning groove engaged with each other as well as a guiding shaft and a guiding groove engaged with each other, the positioning shaft is located at one of the cabinet and the door, the positioning groove is located at the other of the cabinet and the door, the guiding shaft is located at one of the cabinet and the door, and the guiding groove is located at the other of the cabinet and the door; the hinge assembly further comprises a pivoting groove communicated with the positioning groove, and a transition groove which is communicated with the guiding groove and is parallel with the pivoting groove;

wherein the cabinet comprises an outer side surface which is adjacent to the hinge assembly and is located at an extended section of a door rotation path, the door comprises a front wall apart from the accommodation compartment and a side wall always sandwiched between the front wall and the accommodation compartment, a lateral ridge is formed between the front wall and the side wall; when the door is opened from the closed state to the second state, the hinge assembly drives the door to move, such that the lateral ridge is always located on one side of the outer side surface close to the accommodation compartment.

* * * * *